United States Patent [19]
Rees

[11] Patent Number: 5,808,909
[45] Date of Patent: Sep. 15, 1998

[54] ELECTRONIC BRAKE CONTROL VALVE TESTER FOR RAIL CARS AND TRAINS

[76] Inventor: James G. Rees, 960 N. Michigan Ave., Chicago, Ill. 60611

[21] Appl. No.: 529,145

[22] Filed: Sep. 15, 1995

[51] Int. Cl.⁶ .................................................. G01N 7/00
[52] U.S. Cl. .............................. 364/558; 364/510; 73/39; 246/169 R
[58] Field of Search .................... 364/558, 509, 364/510, 426.05; 73/39, 121; 303/20, 15, 28; 246/169 R, 182 B, 189

[56] References Cited

U.S. PATENT DOCUMENTS

| | | |
|---|---|---|
| 3,784,813 | 1/1974 | Ryan . |
| 3,872,711 | 3/1975 | Atkinson et al. . |
| 4,041,283 | 8/1977 | Mosier . |
| 4,041,470 | 8/1977 | Slane et al. . |
| 4,344,138 | 8/1982 | Frasier . |
| 4,440,015 | 4/1984 | Hann . |
| 4,487,060 | 12/1984 | Pomeroy . |
| 4,538,228 | 8/1985 | Brearey et al. ...................... 364/426 |
| 4,553,723 | 11/1985 | Nichols et al. ................... 246/167 R |
| 4,567,757 | 2/1986 | Melocik et al. . |
| 4,687,258 | 8/1987 | Astley . |
| 4,755,803 | 7/1988 | Shockley et al. . |
| 4,774,669 | 9/1988 | Schmitz et al. . |
| 4,847,770 | 7/1989 | Kane et al. . |
| 4,859,000 | 8/1989 | Deno et al. ............................ 303/33 |
| 5,201,834 | 4/1993 | Grazioli et al. . |

*Primary Examiner*—James P. Trammell
*Attorney, Agent, or Firm*—Gardner, Carton & Douglas

[57] ABSTRACT

An automatic, computer controlled air brake testing system having an opening and closing means for opening and closing air passages of a railroad car brake system, a pressure measuring means for determining pressure in the car brake system, a flow measuring means for measuring the air flow rate in the brake system, and controller means for controlling the flow measuring means and the opening and closing means.

10 Claims, 2 Drawing Sheets

ELECTRONIC BRAKE CONTROL VALVE TESTER FOR RAIL CARS AND TRAINS

BACKGROUND OF THE INVENTION

The present invention relates generally to a novel and improved brake control valve tester for rail cars and trains, and more particularly to an electronic brake control valve tester.

Throughout the world, most railway trains and cars are braked by automatic air braking systems. The U.S. braking system was invented by George Westinghouse, but braking systems have become fairly uniform in design and operation throughout the world, even though it has undergone considerable evolutionary improvement through the years. For safety reasons, various countries and regions have ordered mandatory testing requirements of various system components. Some of these test requirements are based upon component time in service.

Testing is usually carried out without removing the control valve or other components from the car (or locomotive) unless they are found to be defective. This testing is customarily done with a device called a Single Car Test Device that is connected to a railway yard compressed air supply, and to the brake system of the car to be tested, by connecting it to the brake pipe hose coupling commonly referred to as the Glad Hand. In the U.S., the testing procedure is conducted in accordance with the testing system Standard S-486, that is propounded by the Association of American Railroads (AAR) and the United States Department of Transportation, Federal Railway Administration (FRA).

Standard S-486 particularly mentions a "device handle" utilizing a rotary valve that is positioned by the operator in any one of a multiplicity of mutually exclusive positions. Thus, for example, if the device handle is in position 1, it will cause release and charging of the vehicle brake system. Moving it from position 1 to position 2 reduces the capacity to charge by positioning the internal rotary valve so that the air flows through a smaller orifice. Further moving it to positions 4, 5, or 6 cause air to be released from the brake pipe. In each case the movement will close the port that is connected and open the next one. Positions 1 and 2 cause air from the regulating valve to flow into the brake pipe. Positions 4 through 6 cause air to be exhausted from the brake pipe through successively larger orifices, thereby releasing the air at accordingly greater rates. When the device is being tested, and during the device handle movements, as provided by S-486, pressure, air flow and time measurements are taken at the appropriate intervals to ensure that the system is working properly. S-486 also specifies a ⅜" bypass valve cock that causes air to be exhausted from the brake pipe, but at a faster rate than provided by any of the rotary valve positions. The valve cock is separate from the device handle and is therefore not mutually exclusive with the positions of the rotary valve and may be operated independently as provided by S-486.

As brake equipment becomes more sophisticated, personnel in the train yards become less able to deal with the burgeoning technologies found in such equipment. As a result, railroad workers require extensive classroom or on-the-job training to familiarize themselves with the new testing procedures. Ultimately, this results in increased cost associated with the testing and maintenance of train brakes.

Therefore, automating the complex functions involved in rail car and locomotive brake testing eliminates the need for most human intervention and allows persons unfamiliar with brake testing methodologies to accurately and quickly conduct the requisite test.

It is contemplated that increasing interest by the railroad community in better quality assurance of braking systems will soon lead to additional tests. Quite likely, there will be a requirement to connect a pressure measurement device to the brake cylinder, in order to determine if there is leakage of the cylinder system in excess of allowable levels. Certain tests made only on new cars at the location of construction, in order to qualify them for entry into the fleet, and also the speeding up of tests for productivity improvement may also be required. It has always been the policy of the AAR that their prescribed tests are minimum requirements, and additional tests, or more stringent limits are permissible and encouraged.

The railroads are now experimenting with electronically controlled air brakes that involve computer network stations on each vehicle. These new brakes are manipulated, measured and controlled by the assistance of electronic signals and data acquisition equipment. Thus, while current braking test systems are adequate to meet the testing requirements of the AAR, it is desirable to test the conventional pneumatic brakes in an improved and more efficient manner. Additionally, a more advanced system for testing or evaluating the new electronically controlled air brake equipment designs are also desirable. Such systems could provide the appropriate means for application, release, control and measurement of electronic brakes for single cars and for full trains or groups of cars.

SUMMARY OF THE INVENTION

To provide an automatic, computer controlled device for testing air brakes on rail vehicles, there is provided an opening and closing means for opening and closing air passages connected to a railroad car brake system, a pressure measuring means connected to the opening and closing means, a flow measuring means for measuring the air flow rate in the railroad car brake system; and controlling means for controlling the flow measuring means and for controlling the opening and closing means.

It is therefore an object of this invention to provide an automatic, computer controlled device for testing air brakes on rail vehicles that is programmed for performing tests in accordance with requirements by appropriate authorities such as the Association of American Railroads.

It is also an object of this invention to provide a brake testing device that is portable and may be easily transported to the desired point of use by a person without the aid of material handling equipment.

A further object of this invention is to provide a brake testing device for testing air brakes that may be programmed to test new brake equipment at a later date.

Another object is to provide a brake testing device which will electronically store test results for display at any time on its built-in display, print the data on a standard computer controlled printer, or transfer the data to another computer or electronic storage medium.

Yet another object of the brake testing device is to provide the capability to test either the present standard pneumatic brakes, or any future braking system.

Also an object is to offer a brake testing device which will operate on extremely low power draw and operate for more than one work shift without battery recharge using only a small portable battery.

DETAILED DESCRIPTION OF A PREFERRED EMBODIMENT

Figure 1:
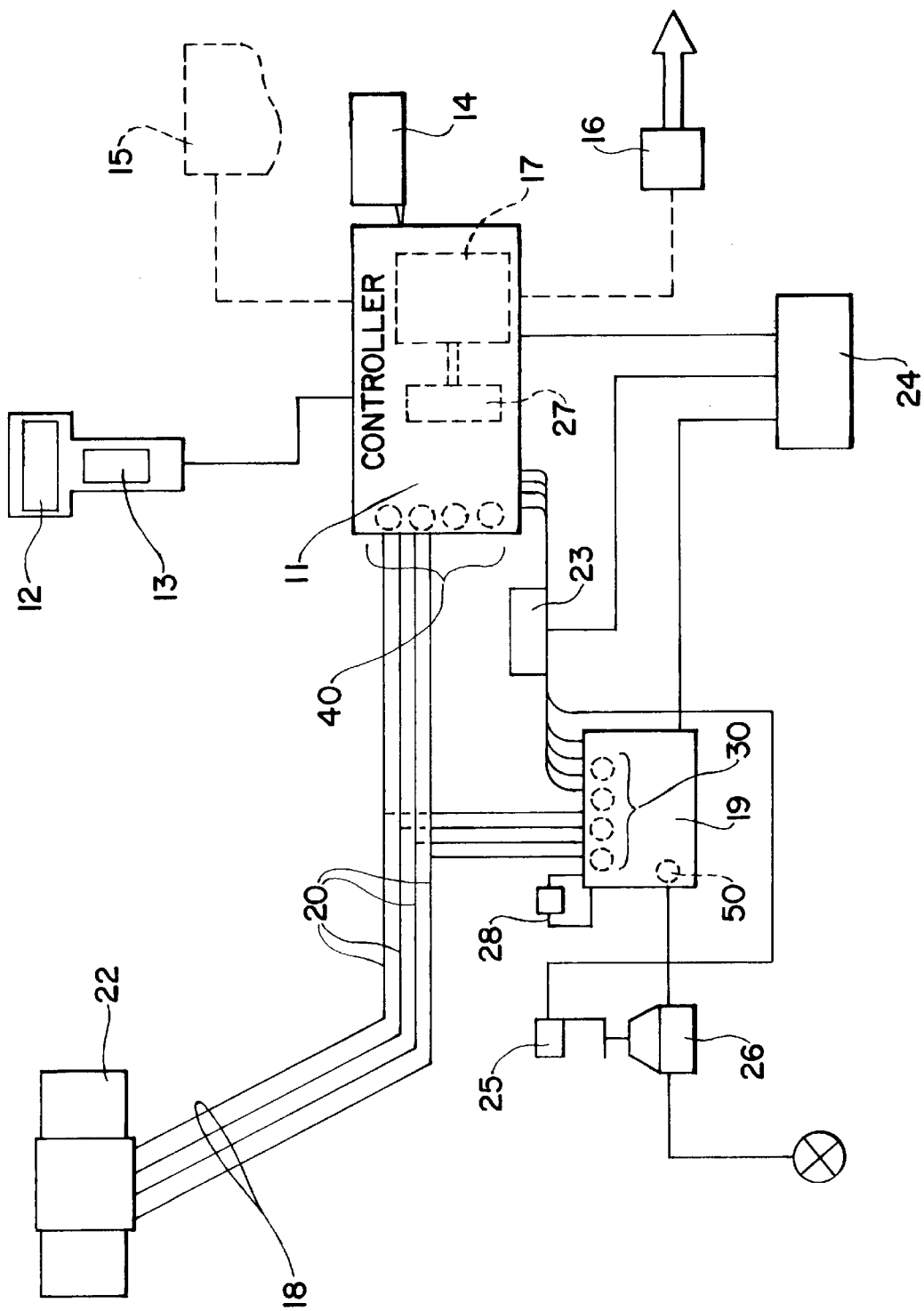
FIG. 1 shows a system level diagram of a brake testing system of a preferred embodiment of the invention.
Figure 2:
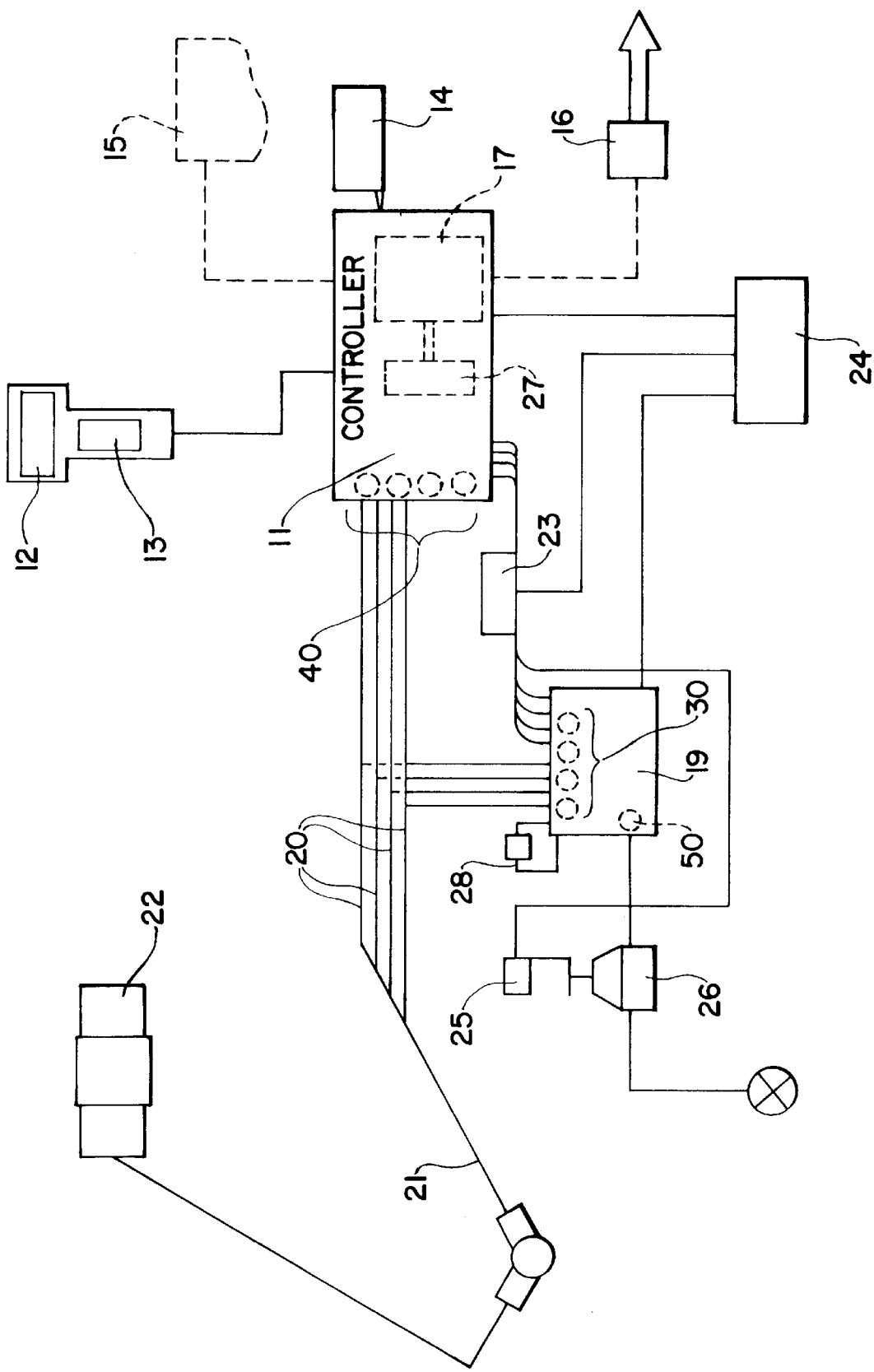
FIG. 2 shows a system level diagram of an alternative embodiment of the invention.

As shown in FIG. 1, a preferred embodiment of the invention comprises a controller 11 having a programmable microprocessor 17. Here the microprocessor is programmed to perform the functions specified in Standard S-486 propounded by the Association of American Railroads and the Federal Railway Administration. As an alternative to a microprocessor 17, other devices such as microcontrollers, programmable gate arrays, or a microcomputer also may be used. Controller 11 preferably also includes a display screen 12, keypad 13, communications interface 14 such as a serial and/or parallel interface, output device 15 such as printer and an interface 16 for connection to an electronically controlled pneumatic ("ECP") brake system. The AAR has recently established standards and parameters for ECP brakes for interchange freight cars and have adopted a system called Lonworks for the connection and protocol.

A rail car air brake control valve 18 is pneumatically connected to the test device 10 and manifold 19 by four "Y-shaped" flexible conduits 20. Alternatively, the controller 11 may be connected to only the brake system by a conventional hose coupling set 21, known as the "Glad-Hands." Current testing systems are connected only in the latter manner, which is sufficient to fulfill the present requirements of the Association of American Railroads (AAR), and the United States Department of Transportation, Federal Railway Administration (FRA). It is desirable, however, that the present invention in a preferred embodiment is connected to the air brake control valve 18 throughout the flexible conduits 20.

Where the command "Move device handle to position _" or where the ⅜" valve cock is to be opened or closed, as instructed in specification S-486, the controller 11 of the present invention will instead cause the appropriate valves 30 located within manifold 19 to open or close. The manifold 19 is preferably made of a block of light-weight metal such as aluminum, and has an orifice 50 into which an air supply hose may be fitted. The manifold 19 may also be manufactured from strong composite materials. The air required for testing enters through the orifice 50 and is routed through a series of appropriate air passages that are connected to the train brake pipe 22 via the conduits 20. The valves 30, preferably low power solenoid valves, are controlled by the controller 11 that signals the amplifier 23 to energize the valves 30 to close or open the appropriate manifold passages to enable air to enter the conduits 20 that are connected to the train brake pipe 22 or to release air from the train brake pipe 22.

For the smaller orifice sizes, that are utilized when S-486 specifies that the device handle is to be moved to Positions 2 or 4, a direct acting solenoid 30 valve may directly close or open the appropriate passage to the brake pipe 20 in the manifold 19. Because of power requirements and size and weight considerations, for the remaining larger orifices a relay valve included in manifold 19 may be caused to shift position by a smaller capacity solenoid valve also in manifold 19.

The opening and closing of the passages is controlled by the controller 11 which sends a signal to the amplifying device 23 to supply the appropriate level of power to cause an opening and closing means, such as the valves 42 to change position, thereby opening or closing the air passages as required. Amplifier 23 may also be electrically connected to a stepper motor 25 that controls a variable pressure air supply valve 26 to regulate the air supply into the manifold 19. The controller 11, as part of the testing procedure, signals the amplifier 23 to energize the stepper motor 25 to open or regulate the valve to supply the proper air pressure for testing. Alternatively, a device that converts pressure output to electrical voltage or current also may be used to vary the delivery pressure.

In order for the present invention to be portable and usable in the open areas of a train yard where no sources of power, such as electrical outlets, are available, the invention is powered by batteries 24. Any small commercially available rechargeable or non-rechargeable power supply means such as a battery having around 5 to 7 amp-hour capacity may be used. The solenoid valves 30 are designed such that they include permanent magnets, so that electrical power is needed only to change their state but is not needed to hold the valves in position. Thus the valves 30 are bistable, and by virtue of the magnets, remain permanently in either position into which they might be placed by a brief pulse of electricity. This reduces the power requirement so that the single small battery can power the equipment for up to 16 to 20 hours or more of normal operation.

The microprocessor 17 of controller 11 is especially designed for low power draw, and has an automatic sleep mode. During periods of inactivity, this mode reduces the power used by the controller 11 to a very low level, while retaining information in its dynamic random access memory 27. In a preferred embodiment, the microprocessor 17 is interfaced to on-board memory such as "flash" memory, that retains erasable information in the memory without drawing any power (non-volatile). Additionally, the operating instructions for microprocessor 17 are stored in read-only memory. The memory may consist of additional "flash" memory, EEPROMs, or other non-volatile memories, that can be easily reprogrammed if the invention is required to perform other test functions, or if the AAR or FRA recommend other tests.

The invention is equipped with pressure measuring means, such as pressure measuring means, such as pressure transducers 40 that are small in size and weight and draw very little power. The transducers 40 are used to detect drops in pressure which could tend to indicate leakage in the brake system. A voltage transducer may also be used with only slight changes to the circuit board. The transducers 40 are installed on the controller 11 circuit board, and may be switched on and off as necessary, thereby drawing power only when the program needs to have a reading. Each place where pressure measurements or air gauges are mentioned in S-486, the invention utilizes pressure transducers 40 which deliver an electrical current or voltage that is proportional to the air pressure as measured in the conduit hoses 20. The transducer 40 output is read by the controller 11, and converted to engineering units, such as pounds per square inch.

Standard S-486 specifies the use of a flow meter, that is typically a variable orifice floating ball device, visually observable by the operator for measuring the air flow rate in the railroad car brake system. The observed accuracy of the flow meter is not considered under modern quality standards to be acceptable for precision measurement. Thus, the invention substitutes for this device a commonly found volumetric, temperature compensated, electronic flow measuring means, such as flow meter 28 that is located on the manifold 19 between the air intake orifice 50 and the air passages that are connected to the conduit hoses 20. Like the pressure transducers 40, the flow meter 28 may be turned on and off by the controller 11 as it is needed, reducing power usage and providing reliable flow measurement that can be evaluated by the computer. Electronic mass flowmeters may also be used. Standard S-486 also specifies timing certain functions, that are customarily done with a stop watch. All timing functions in the invention are carried out at a high level of accuracy and repeatability by using the internal clock of the microprocessor 17.

To operate a preferred embodiment of the testing system 11 of the present invention, the controller 11 is first connected to an operator interface, consisting of an LCD (liquid crystal display) 12, for observation of results and instruction prompts, and to a keypad 13, with which the operator may enter variable data, such as identity of the vehicle being tested and other information. The controller 11 is then electrically connected to the amplifier 23, which is then electrically connected to the valves 30 in the manifold 19, the flow meter 28, and the stepper motor 25. Controller 11 is then pneumatically connected to one leg of the "Y" of the conduits 20 that are connected to the air brake pipe 22. The manifold 19 is connected to the other leg of the "Y" of the conduits 20 and is also connected to an air supply hose.

The controller 11 is then activated and executes the built-in test program where the valves 30 are opened and closed, the air supply is varied, and the air pressure and air flow rates are measured, in accordance with S-486 test standards, or any test method that is currently specified. The microprocessor 17 then evaluates each test parameter, and stores the allowable limits as well as the actual test result. The controller 11 then indicates if the tests pass or fail. As the test progresses, and at its conclusion, the operator may command the information to be displayed so it can be known if the brakes on the vehicle are conforming to expectations. All information entered by the operator or acquired by the computer during the tests are stored internally in the controller 11 for later disposition by the operator. The information may be printed to an optional printer 15 that can be connected to the controller 11, or the information may be downloaded to magnetic media (discs, tapes, etc.) or transferred to another computer by way of a communications port 14, such as serial port or parallel port, where it may be archived or used in statistical or quality measurement routines.

The invention is designed to be reasonably weather resistant, and rated for continuous performance in rain, snow or blowing dust, at temperatures as low as −40 degrees Fahrenheit or as high as +140 degrees Fahrenheit. Since the invention might be used out of doors in a climatic condition that may be found in North America, and because LCD displays become inactive at low temperatures, the display in the invention can be equipped with a blacklight that can be switched on and off on demand, and an automatic temperature sensitive heater that turns on only at low temperatures.

All trains must, by federal law, undergo certain tests before they may be dispatched. The invention is equipped with an interface 16 that will permit testing of cars equipped with the new ECP brake system. The invention will also be capable of testing full trains or groups of cars coupled together. This feature will have great benefit to the railroads, since not all locomotives are equipped to control ECP brakes, and furthermore the locomotive consist for such trains might have values in the multi-million dollar range, and require highly paid operating crews. The ability to completely pre-test a train before attaching the locomotive will save considerable time and money, since neither the locomotives nor the crew will need to be present for all of the testing.

The present invention has been described with respect to certain embodiments and conditions which are not meant to and should not be construed to limit the scope of the invention. Those skilled in the art will understand that variations from the embodiment and conditions described herein may be made without departing from the true scope of the invention as defined in the appended claims.

What is claimed is:

1. An electronically controlled rail car brake control valve testing system for testing brakes of an isolated railroad car comprising:

opening and closing means for opening and closing air passages connected to a railroad car brake system of an isolated car for testing the air pressure and leakage in the brake system and generating test results;

flow measuring means connected to the opening and closing means for measuring the air flow rate in the railroad car brake system and generating test results;

controller means connected to the flow measuring means and to the opening and closing means for controlling the flow measuring means and for controlling the opening and closing means according to a prescribed test routine for the brake system of the isolated car to generate the test results; and pressure measuring means connected to the controlling means for measuring the air pressure of the air in the railroad car brake system and generation test results.

2. The rail car brake control valve testing system of claim 1 further comprising an amplifier responsive to a signal generated by the controller means for energizing the opening and closing means.

3. The rail car brake control valve testing system of claim 1 wherein the opening and closing means comprises solenoid valves responsive to a signal generated by the controller means for opening and closing the air passages.

4. The rail car brake control valve testing system of claim 1 wherein the opening and closing means comprises bistable valves that remain permanently in a position until the controller means signals the bistable valves to change position.

5. An electronically controlled rail vehicle air brake testing system for testing brakes of an isolated railroad car comprising:

opening and closing means for opening and closing air passages connected to a railroad car brake system of the isolated car for testing the air pressure and leakage in the brake system;

flow measuring means connected to the opening and closing means for measuring the air flow rate in the railroad car brake system;

a programmable microcomputer connected to the flow measuring means and opening and closing means for controlling the flow measuring means and for controlling the opening and closing means according to a prescribed test routine for the brake system of the isolated car to generate the test results; and pressure measuring means connected to the controller means for measuring the air pressure of the air in the railroad car brake system.

6. The rail car brake control valve testing system of claim 5 wherein the microcomputer has on-board memory for storing the brake system air pressure test results and leakage test results.

7. The rail car brake control valve testing system of claim 5 wherein the microcomputer further comprises an interface for testing electronically controlled pneumatic train braking systems.

8. The testing system of claim 7 including a stepper motor controlled by the microcomputer for incrementally opening or regulating an air supply valve used to supply air to the testing system.

9. The testing system of claim 7 wherein the microcomputer is programmed with a software algorithm executing the steps comprised of:
   (a) changing the position of the valves for opening and closing the air passages to the brake system;
   (b) measuring the pressure of the air in the railroad car brake system and generating results;
   (c) measuring the air flow rate of the air entering and exiting from the brake system and generating results; and
   (d) storing the results from the measurement of the air pressure and measurement of the air flow rate.

10. An electronically controlled rail vehicle air brake testing system for testing brakes of an isolated railroad car comprising:
   bistable solenoid valves for opening and closing air passages connected to a railroad car brake system of the isolated railroad car for testing the air pressure and leakage in the railroad car brake system;
   flow measuring means connected to the solenoid valves for measuring the air flow rate in the railroad car brake system;
   a programmable microcomputer connected to the flow measuring means and solenoid valves for controlling the flow measuring means and for controlling the opening and closing of the solenoid valves according to a prescribed test routine for the brake system of the isolated car to generate the test results;
   pressure measuring means connected to the microcomputer for measuring the air pressure of the air in the railroad car brake system; and
   a portable power supply means connected to the solenoid valves, flow measuring means, programmable microcomputer and pressure measuring means for providing operating power.

* * * * *